US007002962B2

(12) United States Patent
Hurlocker

(10) Patent No.: US 7,002,962 B2
(45) Date of Patent: *Feb. 21, 2006

(54) METHOD, PROCESSOR AND SYSTEM OF PROVIDING ATM UNIDIRECTIONAL PATH SWITCHED RING FUNCTIONALITY

(75) Inventor: Claude M. Hurlocker, Raleigh, NC (US)

(73) Assignee: Alcatel Alsthom Compagnie Generale D'Electricite, Paris (FR)

(*) Notice: Subject to any disclaimer, the term of this patent is extended or adjusted under 35 U.S.C. 154(b) by 854 days.

This patent is subject to a terminal disclaimer.

(21) Appl. No.: 09/950,949

(22) Filed: Sep. 11, 2001

(65) Prior Publication Data

US 2002/0031137 A1  Mar. 14, 2002

Related U.S. Application Data

(62) Division of application No. 09/036,453, filed on Mar. 6, 1998, now Pat. No. 6,320,860.

(51) Int. Cl.
*H04L 12/56* (2006.01)

(52) U.S. Cl. .................... 370/395.1; 370/236.2

(58) Field of Classification Search ............ 370/258, 370/395, 396, 397, 399, 404, 222, 223, 224, 370/400, 409, 419, 405, 216, 389, 236.2, 370/236.1

See application file for complete search history.

(56) References Cited

U.S. PATENT DOCUMENTS

| 5,907,554 A | 5/1999 | Klos et al. |
| 5,949,755 A | 9/1999 | Uphadya et al. |
| 6,097,722 A | 8/2000 | Graham et al. |
| 6,104,714 A | 8/2000 | Baudelot et al. |
| 6,320,860 B1 * | 11/2001 | Hurlocker ............ 370/395.51 |
| 6,442,134 B1 * | 8/2002 | Mitchell .................. 370/223 |

OTHER PUBLICATIONS

"Ring Survivability in ATM Networks", J. Morgan, National Fiber Optic Engineers Conference, Jun. 18-22, 1995, Boston, pp. 1067-1077.
"ATM Virtual Path Group Protection Switching", Contribution to T1 Standards Project T1D1-23 Broadband Aspects of ISDN, T1S1.5/96-110, Lucent Technologies, Aug. 1996, p. 1-12.
"ATM VP Fault Reconfiguration Proposal for Uni-Ring Networks", D. Krisher, Contribution to T1 Standards Project: SONET Rates and Formats, T1X1.5/96-044R1; T1S1.5/96-013R1, Alcatel Network Systems, Aug. 1996, pp. 1-18.
"Protection Bundling for ATM Protection Switching", J. Manchester, Contribution to T1 Standards Project—T1S1.5, T1X1.5, Bellcore, Jun. 1996, pp. 1-10.
"ATM Protection Switching of Virtual Path Groups Using APS Channels", S. Asselin et al, Contribution to T1 Standards Project T1S1.5, Northern Telecom, Sep. 1996, pp. 1-5.
"Cell Loss Priority (CLP) Method of Virtual Path (VP) Protection", N. Shimada et al, Contribution to T1 Standards Project—T1X1,5/96-133; T1S1.5/96-, NEC America, Inc., Oct. 1996 pp. 1-9.
"ATM Functions in SONET/SDH Network Elements", B. Allen, *Contribution to T1 Standards Project—T1X1.5*, Northern Telecom, Oct. 1996, pp. 1-3.

* cited by examiner

*Primary Examiner*—Brenda Pham
(74) *Attorney, Agent, or Firm*—Jim Zegeer

(57) ABSTRACT

ATM path switched ring switching is based on a ring segment BIP. An ATM VP ring segment is defined as originating at an ATM VP ring input and terminating at an ATM VP ring output. A ring segment BIP is composed of the path BIP error counts of multiple SONET/SDH paths from the ring segment input to the ring segment output.

8 Claims, 3 Drawing Sheets

METHOD, PROCESSOR AND SYSTEM OF PROVIDING ATM UNIDIRECTIONAL PATH SWITCHED RING FUNCTIONALITY

CROSS REFERENCE TO RELATED APPLICATION

The present application is a divisional of U.S. Ser. No. 09/036,453 filed Mar. 6, 1998, now U.S. Pat. No. 6,320,860 from which priority is claimed under 35 U.S.C. §120.

BACKGROUND OF THE INVENTION

1. Technical Field of the Invention

The present invention relates to asynchronous transfer mode (ATM) and, more particularly, to ATM unidirectional path switched ring switching criteria.

2. Discussion of Related Art

Various methods of implementing ATM rings were documented in a Fujitsu paper "Ring Survivability in ATM Networks" presented by Jonathan A. Morgan at the National Fiber Optic Engineers (NFOCE) Conference in June of 1995. However, a solution to provide fast switching independent of the cell traffic was not described. ATM unidirectional path switched ring switching criteria must be independent of cell traffic rate and must be compatible with variable bit rate (VBR) and with Virtual Paths (VPs) set-up but with no traffic.

SUMMARY OF INVENTION

An object of the present invention is to provide ATM path switched ring switching criteria.

According to the present invention, a selection method for selecting a path in an asynchronous transfer mode (ATM) unidirectional path switched ring comprises the steps of (a) defining ring segments as different ring paths originating at a same ATM virtual path (VP) ring input and terminating at a same ATM VP ring output wherein a ring segment includes all ring nodes from the ring input to the ring output, (b) determining a preferred ring segment according to a switching criterion that is independent of cell traffic rate, and (c) group switching all VPs which transit the preferred ring segment determined in step (b).

According further to the present invention, the step of determining comprises the steps of computing a running average of a sum of path bit-interleaved-parity (BIP) error counts for each ring segment and selecting the preferred ring segment as the one having the lowest BIP error count.

The basic idea of the present invention is to base the VP cell ring switching on a criterion that is independent of cell traffic rate, that is compatible with variable bit rate (VBR) and with virtual paths (VPs) set-up but with no traffic. Such a criterion is, according further to the invention, a "ring segment" BIP. As mentioned, an ATM VP ring segment may be defined as originating at the ATM VP ring input at a ring entry node and terminating at the ATM VP ring output at a ring exit node. A ring segment BIP may be composed of the path BIP error counts of multiple synchronous optical network (SONET)/synchronous digital hierarchy (SDH) paths over the ring segment from the ring segment input to the ring segment output.

These and other objects, features and advantages of the present invention will become more apparent in light of the following detailed description of a best mode embodiment thereof, as illustrated in the accompanying drawing.

DETAILED DESCRIPTION OF A PREFERRED EMBODIMENT

Figure 1:
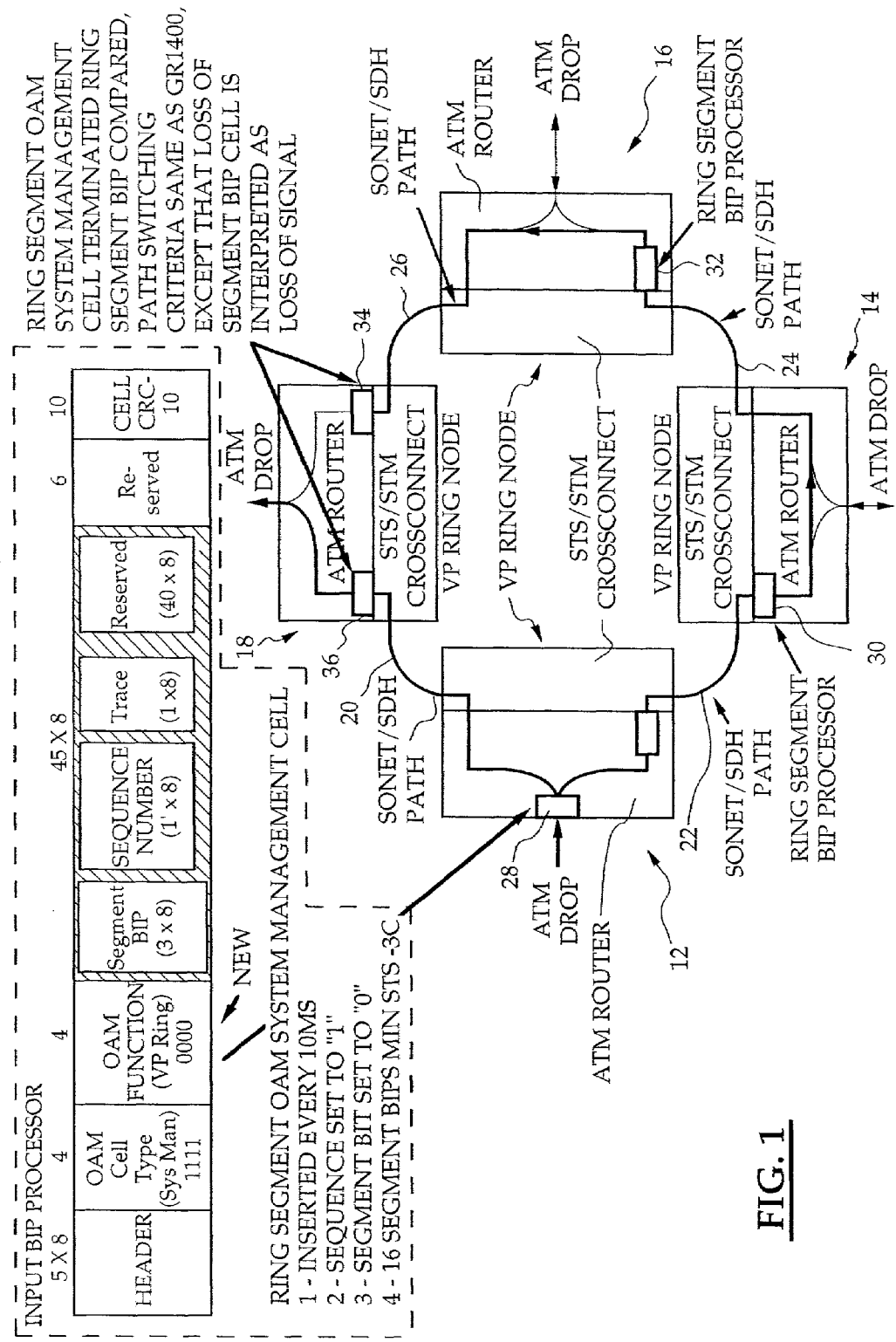
FIG. 1 shows ATM VP ring segment BIP switching and an input BIP processor, according to the present invention.

FIG. 1 shows a plurality of virtual path (VP) ring nodes including, for purposes of the illustration, a node 12 designated as a ring entry or input node and a plurality of additional VP ring nodes, in this case three additional VP ring nodes designated with reference numerals 14, 16, 18. The VP ring node 18 serves, for the given example, as the output node or ring exit node. It is reached over two different ring segments formed by several, in this case two, different SONET/SDH unidirectional paths and including the entry and exit node and all nodes in between. An ATM VP ring segment such as a path 20 between and including VP ring entry node 12 and VP ring exit node 18, may be defined, according to the invention, in just that way, as originating at an ATM VP ring input such as at node 12 and terminating at an ATM VP ring output such as VP ring node 18. In this case, there are no other nodes in between the entry node 12 and the exit node 18. The SONET/SDH path 20, along with the entry and exit nodes 12, 18, constitute an ATM/VP "ring segment" according to this definition. Similarly, for the same example, a path 22 connecting and including VP ring nodes 12 and 14 in conjunction with a path 24 connecting and including ring nodes 14 and 16 and a path 26 connecting and including VP ring nodes 16 and 18 altogether constitute another ATM VP ring segment according to this definition.

According further to the present invention, the VP cell ring switching criteria may be based on a "ring segment" bit-interleaved-parity (BIP) test. A ring segment BIP is composed of the path BIP error counts of multiple SONET/SDH paths from the ring segment input node 12 to the ring segment output node 18.

As can be seen from FIG. 1, each VP ring node may comprise, e.g., a synchronous transport system (STS)/synchronous transport module (STM) cross connect plus an ATM router. Within each router is shown, e.g., at least one block constituting a ring segment BIP processor. For instance, a ring segment BIP input processor 28 is shown in the VP ring node 12. Similarly, a ring segment BIP intermediate processor 30 is shown in the ATM router within the VP ring node 14. A ring segment BIP intermediate processor 32 is also shown within an ATM router in the VP ring node 16. Two separate ring segment BIP output processors 34, 36 are illustrated in the VP ring node 18 within an ATM router therein. These two ring segment BIP output processors 34, 36 respectively, terminate the ring segment that includes paths 22, 24, 26 and the ring segment that includes path 20.

As illustrated in FIG. 1, for example, at the VP ring entry node 12, a newly defined ring segment operation and maintenance (OAM) function cell is inserted every ten milliseconds. The ring segment BIP is set to zero, as shown. The new cell is sent out over both segments, along with the other standard cells. Each VP ring intermediate and output node ring segment BIP processor keeps a ten millisecond running average of the SONET/SDH path BIP error count.

Figure 2:
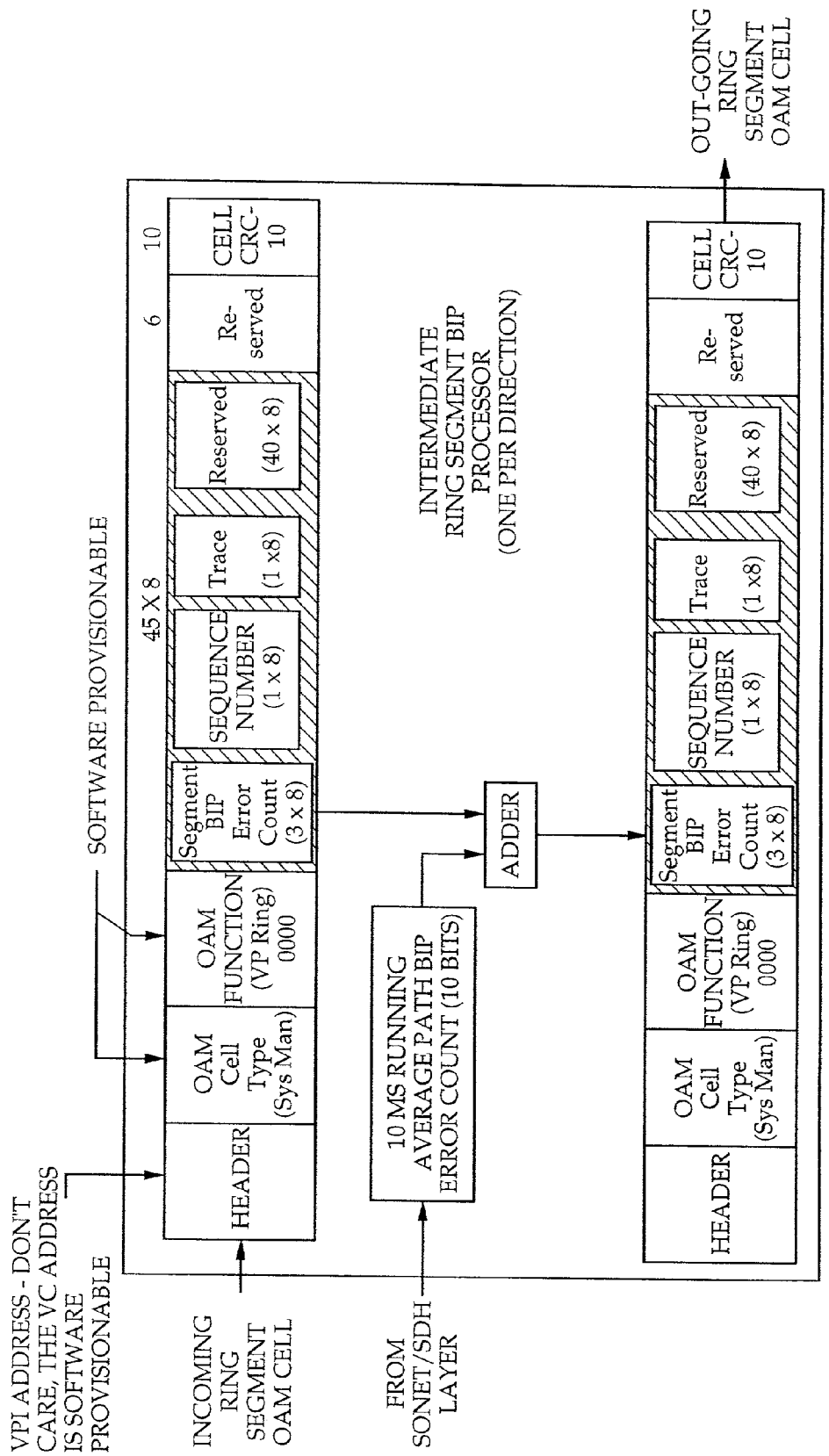
FIG. 2 shows a functional block diagram of a ring segment BIP intermediate processor according to the present invention.

FIG. 2 shows a functional block diagram of a ring segment BIP intermediate processor. This ten millisecond running average of the SONET/SDH path BIP error count is added to the ring segment BIP count in an incoming ring segment OAM cell and the sum is used as the new ring segment BIP count in the outgoing ring segment OAM cell. This is illustrated functionally by an adder in FIG. 2 receiving a segment BIP error count and a ten millisecond running average path BIP error count from the SONET/SDH layer.

At the output node 18, containing two BIP output processors, one 36 for path 20, one 34 for path 22, 24 and 26, a service selector can choose the better side by comparing the ring segment BIP counts. The selector can switch, for example, on loss of ring segment OAM cell or segment BIP.

In this way, ring switching is provided independent of the cell traffic rate although some bandwidth is required to perform the above function.

Figure 3:
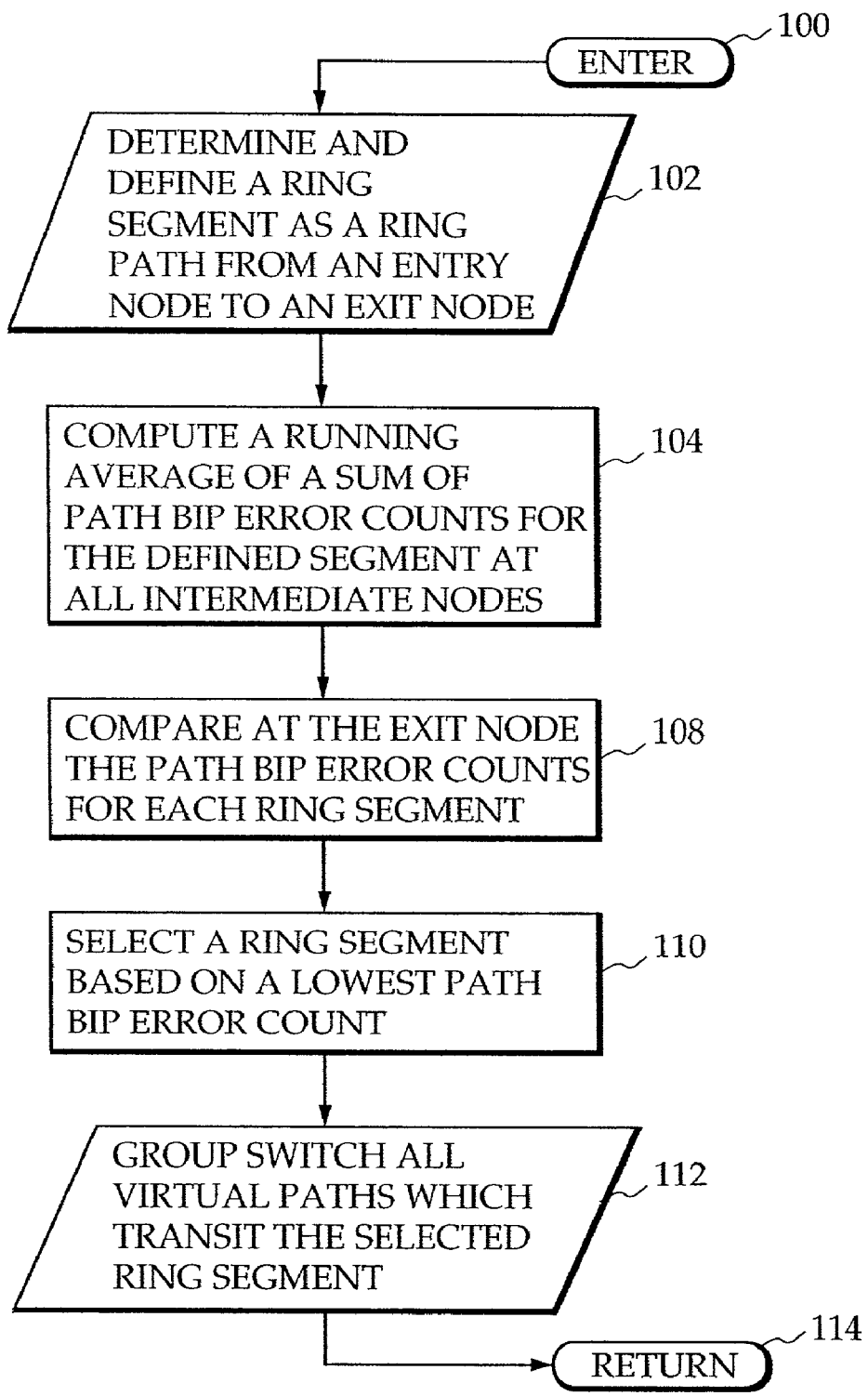
FIG. 3 shows a simplified flow chart illustration of a series of steps which may be carried out, according to the invention, for selecting a path in an ATM switched ring.

FIG. 3 shows a simplified flowchart illustration of a series of steps which may be executed for providing ATM unidirectional path switched ring functionality, according to the present invention. After entering in a step 100, a step 102 may be executed for determining and defining a ring segment as a ring path from an entry node to an exit node of an ATM ring made up of plural segments. A ring segment is defined as originating at an ATM virtual path (VP) ring input and terminating at an ATM VP ring output, and including all ring nodes from the ring input to the ring output. A step 104 may next be executed for computing a running average of a sum of path BIP error counts for the ring segment defined step 102. After computing a running average of a sum of the path BIP error counts for each defined segment of the ring, a step 108 may next be executed for comparing, e.g., at the ATM VP ring exit node, the path BIP error counts for each ring segment. A step 110 may then be executed for selecting a ring segment based on a lowest path BIP error count for the selected ring segment, and then group switching, as shown in a step 112, all virtual paths which transit this selected ring segment. A return is then made in a step 114, and entrance may once again be made in the step 100, as desired, for repetition thereof.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Selection method for selecting a path in an asynchronous transfer mode (ATM) switched ring, comprising the steps of:
    defining ring segments as different ring paths originating at a same ATM virtual path (VP) ring input and terminating at a same ATM VP ring output node wherein a ring segment includes all ring nodes from the ring input to the ring output node;
    determining a preferred ring segment according to a criterion that is independent of cell traffic rate; and
    group switching all virtual paths which transit this selected ring segment.

2. The method of claim 1, wherein said step of determining comprises:
    computing a running average of a sum of path bit interleaved parity (BIP) error counts for each ring segment originating at said same ATM VP ring input and terminating at said same ATM VP ring output; and
    comparing at said ATM VP ring output said path BIP error counts for each ring segment and selecting a ring segment based on a lowest path BIP error count for the selected ring segment.

3. A processor for use in a network element (12, 14, 16, 18) in an asynchronous transfer mode (ATM) unidirectional path switched ring, comprising:
    a first direction ring segment bit interleaved parity (BIP) processor, responsive to an incoming ring segment operation and maintenance (OAM) cell having a segment BIP error count transported therein in said first direction, for providing said segment BIP error count to an adder for summation with a running average path BIP error count, said adder for providing an updated segment BIP error count for transport on an outgoing ring segment OAM cell in said first direction; and
    a second direction ring segment bit interleaved parity (BIP) processor, responsive to an incoming ring segment OAM cell having a segment BIP error count transported therein in said second direction, for providing said segment BIP error count to an adder for summation with a running average path BIP error count, said adder for providing an updated segment BIP error count for transport on an outgoing ring segment OAM cell in said second direction.

4. A system comprising a plurality of network elements interconnected by a pair of ATM unidirectional path switched rings, each network element including first and second processors as claimed in claim 3.

5. Selection method for selecting a path in an asynchronous transfer mode (ATM) unidirectional path switched ring, comprising the steps of:
    defining the ring segments as different ring paths originating at a same ATM virtual path (VP) ring input node and terminating at a same ATM VP ring output node wherein a ring segment includes all ring nodes from the ring input node to the ring output node;
    determining a preferred ring segment according to a selected criterion; and
    at said same ATM VP ring output, group switching all virtual paths which transit this selected ring segment.

6. The method of claim 5, wherein said step of determining comprises:
    computing a running average of a sum of path bit interleaved parity (BIP) error counts for each ring segment originating at said same ATM VP ring input and terminating at said same ATM VP ring output; and
    comparing at said ATM VP ring output said path BIP error counts for each ring segment and selecting a ring segment based on a lowest path BIP error count for the selected ring segment.

7. A system comprising a plurality of network elements interconnected by an asynchronous transfer mode (ATM) path switched ring, each network element having a processor for carrying out the method of claim 5.

8. A system comprising a plurality of network elements interconnected by an asynchronous transfer mode (ATM) path switched ring, each network element having a processor for carrying out the method of claim 6.

* * * * *